United States Patent [19]
Capdepuy et al.

[11] Patent Number: 5,581,806
[45] Date of Patent: Dec. 10, 1996

[54] DEVICE FOR THE MECHANICAL HOOKING OF A DISPLAY SYSTEM TO A HELMET

[75] Inventors: Pascal Capdepuy, Merignac; Jean-Marc Darrieux, Bordeaux, both of France

[73] Assignee: Sextant Avionique, Meudon la Foret, France

[21] Appl. No.: 400,866

[22] Filed: Mar. 8, 1995

[30] Foreign Application Priority Data

Mar. 8, 1994 [FR] France ................................ 94 02643

[51] Int. Cl.⁶ ............................... A42B 3/04; G02B 7/00
[52] U.S. Cl. ..................... 2/6.2; 2/422; 2/6.3; 359/632; 359/815
[58] Field of Search .................. 2/6.1, 6.2, 6.3, 2/6.6, 422, 10; 359/630, 632, 815, 816, 409

[56] References Cited

U.S. PATENT DOCUMENTS

| | | |
|---|---|---|
| 4,156,292 | 5/1979 | Helm et al. . |
| 4,231,117 | 11/1980 | Aileo .............................................. 2/6.2 |
| 4,449,787 | 5/1984 | Burbo et al. . |
| 5,331,684 | 7/1994 | Baril et al. ..................................... 2/6.2 |
| 5,367,402 | 11/1994 | Holmes et al. ................................ 2/6.2 |

FOREIGN PATENT DOCUMENTS

| | | |
|---|---|---|
| 2672777 | 8/1992 | France . |
| 2672778 | 8/1992 | France ............................................ 2/6.2 |
| 2632263 | 1/1978 | Germany . |
| 2062285 | 5/1981 | United Kingdom . |
| 2167644 | 6/1986 | United Kingdom . |
| 2179543 | 3/1987 | United Kingdom . |

*Primary Examiner*—Michael A. Neas
*Attorney, Agent, or Firm*—Oblon, Spivak, McClelland, Maier & Neustadt, P.C.

[57] ABSTRACT

A device for the mechanical hooking of a display system to a helmet which includes a sheath that surrounds the body of the display system except for elbowed optical elements leading to the combiner forming the eye-piece of the display system and that has a projecting longitudinal ridge acting as a guiding shaft for the hooking and as a fastening lug, and also includes a hooking stud. The device also has a stage that is interposed between the side wall of the helmet and the sheath. This stage is provided with a channel designed to receive the longitudinal ridge of the sheath and a hook jaw designed to grasp the hooking stud. The device is fixed to the side wall of the helmet by mechanism enabling the adjustment of its position both vertically and laterally, to enable the adjusting of the position of the eye-piece of the display system in the alignment of the helmet wearer's eye.

30 Claims, 4 Drawing Sheets

5,581,806

DEVICE FOR THE MECHANICAL HOOKING OF A DISPLAY SYSTEM TO A HELMET

BACKGROUND OF THE INVENTION

The present invention relates to a device for the mechanical hooking of a monocular display system to a pilot's helmet.

BACKGROUND OF THE INVENTION

The monocular display system is formed by a cathode-ray tube associated with a wide-field optical system that enables the presenting, before one of the helmet wearer's eyes, of an image superimposed on the external scene, giving various information.

The helmet wearer should be easily able to hook the display system to his helmet or unhook it therefrom and, when the display system is hooked to the helmet, to retract or not retract the optical element, known as a combiner, that is placed before his eyes so that he can see the image of the display system superimposed on the external scene. Furthermore, it should be possible for the position of the combiner to be adjusted in height and width before the helmet wearer's eye so as to match different types of faces.

SUMMARY OF THE INVENTION

The present invention is therefore aimed at:

a easy and practicable operation that can be performed without looking by the wearer of the helmet to mount a monocular display system on and dismount it therefrom, a possibility of adjusting the position of the monocular display system with respect to the helmet enabling the adjustment in height and width of the position of the combiner before the helmet wearer's eyes, high precision positioning of the monocular display system with respect to the helmet, averting the need for repeating the adjustments at each hook-on operation when the helmet wearer is the same person.

An object of the invention is a device for the mechanical hooking of a display system to a helmet comprising:

a sheath that surrounds the body of the display system except for elbowed optical elements leading to the combiner forming the eye-piece of the display system that gets placed before an eye of the helmet wearer, said sheath having a longitudinal ridge projecting out of the lower part of its side wall pointed towards the helmet and acting as a guiding shaft for the hooking and as a fastening lug, and a hooking stud projecting from the upper part of its side wall pointed towards the helmet, and a stage or assembly that is fixed to a side wall of the helmet at two lower fastening points by hinging means that allow it two degrees of freedom, one in vertical translation and the other in rotation about an axis passing through said lower fastening points, and at an upper fastening point by position-adjusting means enabling positional adjustments in the vertical and lateral directions with respect to the helmet and that comprises, in its lower part, a channel with the dimensions of the longitudinal ridge of the sheath that it confines and, in its upper part, a hook jaw working together with the hooking stub of the sheath to keep the sheath in position on the stage.

Advantageously, the sheath and the stage face a centering pin and a cavity having a complementary shape working together to give the sheath a precise hooking position with respect to the stage.

Advantageously, the hinging means located at the lower points for the fastening of the stage to the helmet are formed by a hinge element fixed to the helmet engaged with the ends of the channel of the stage grasped by means of slideways or grooves permitting a vertical translational motion in addition to the rotational motion.

Advantageously, the means for adjusting the position of the upper fastening point of the stage to the helmet comprise: a base fixed to the lateral wall of the helmet and two adjusting screws to positioned at right angles with respect to each other, one vertical and the other horizontal and perpendicular to the side wall of the helmet, the rods of which get screwed into the threaded holes of the base and the heads of which are confined in the upper part of the stage.

Advantageously, the sheath leaves the body of the display system rotationally free, enabling the display system to take various positions, including a first position called an operational position where the combiner constituting the eyepiece gets placed before an eye of the helmet wearer and a second position, called a retracted position, where the combiner forming the eye-piece gets placed outside the field of the vision of the helmet wearer. In this case, the sheath has means to rotationally lock the body of the display system in the two positions which are the operational and retracted positions.

BRIEF DESCRIPTION OF THE DRAWINGS

Other advantages and features of the invention shall emerge from the following description of an embodiment given by way of an example. This description is made with reference to the drawings wherein.

DETAILED DESCRIPTION OF THE PREFERRED EMBODIMENTS

Figure 1:
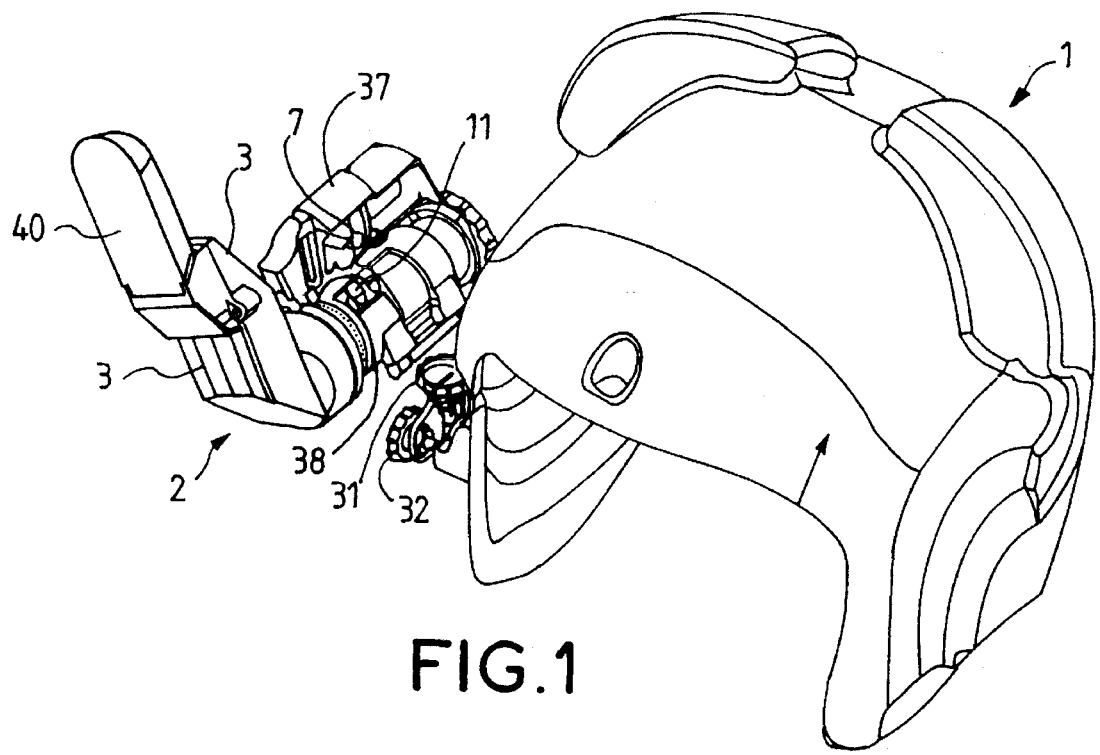
FIGS. 1 and 2 are views in perspective at different angles of a helmet with, at some distance, a monocular display system, the helmet and the system being fitted with a hooking device according to the invention.
Figure 2:
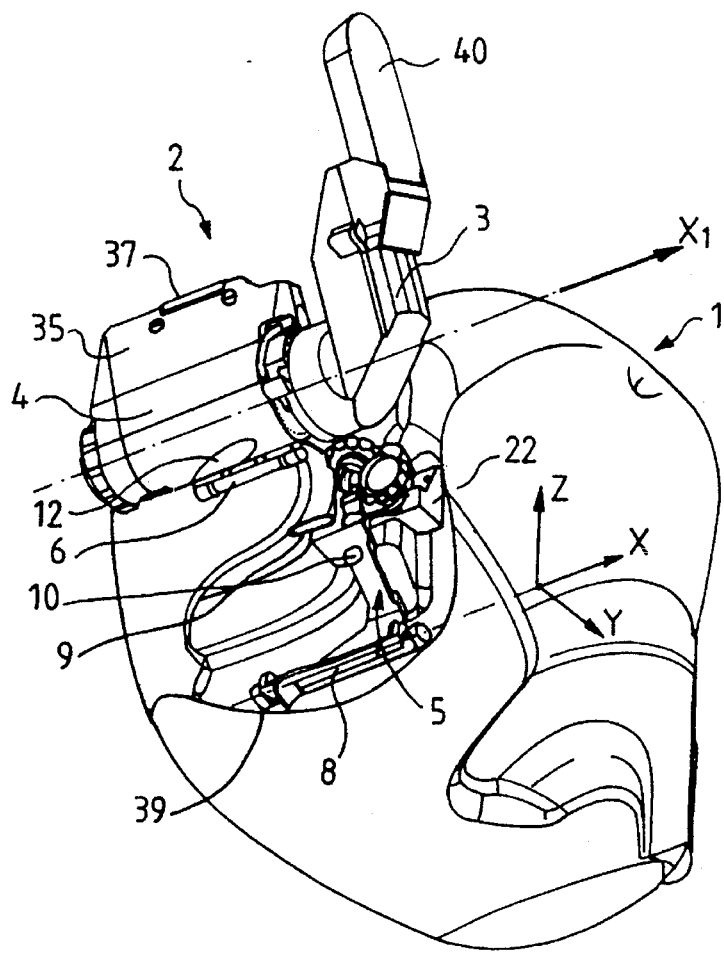

FIGS. 1 and 2 shows, at different angles of view, a pilot's helmet 1 with, at some distance on the right-hand side, a monocular display system 2 designed to be hooked to it.

The monocular display system 2 is formed by a cathode-ray tube placed on the side of the head and an elbowed wide-field optical system 3 going from the screen of the cathode-ray tube to an eye-piece formed by a combiner enabling an image from the cathode-ray tube superimposed on the external scene to be placed before an eye.

The cathode-ray tube of the display system 2, which is cylindrical, is placed in a sheath 4 that gets fixed to the side wall of the helmet 1 by means of a stage 5.

The sheath 4 gets hooked to the stage 5 by means of a longitudinal ridge 6 extending, in relief, the lower of its side wall pointed to the helmet 1 and to a hooking jaw 7 which can be seen in FIG. 1 and projects out of the upper part of its side wall pointed towards the helmet 1.

The stage 5 shown in detail in FIGS. 3 to 5 has the shape of an inverted T and is placed on the right-hand side of the helmet in front of and below a protuberance located at the ear, and encloses a hinge system for a visor. In its lower part, at the arms of the T, it has a channel 8 with the dimensions of the longitudinal ridge 6 of the sheath 4 and, in its upper part, has a hook jaw 9 working in cooperation with the hooking stub 7 of the sheath 4.

During the hooking of the sheath 4 to the stage 5, the channel 8 of the stage 5 confines the longitudinal ridge 6 of the sheath 4 allowing the sheath 4 only rotational motion about its axis, a motion that is blocked, at the end of its travel, by the hooking of the hooking stub 7 of the sheath into the hook jaw 9 of the stage 5.

The channel 8, like the hook jaw 9, allows a certain degree of play in the positioning of the sheath 4 with respect to the stage 5. The play is put to use in order to provide for precision positioning by means of a centering pin 10 fixed to the stage 5 in the vicinity of the base of the hook jaw 9 that penetrates a cavity 11 having a corresponding shape made in a shoulder 38 located on the side facing the sheath 4.

The blind hooking operation wherein the helmet wearer, without looking, hooks the sheath 4 to the display system on the stage 5 is facilitated by a hollow recess 12 made in the lower side wall of the sheath 4 to guide the thumb during grasping of the sheath 4 and by an end-of-travel positioning tappet 39 placed on the back of the channel 8 on which the thumb abuts when the longitudinal ridge 6 of the sheath is ready to penetrate the channel 8.

The stage 5 is fixed to the side wall 1 by three fastening points, two lower points engaged with the ends of the channel 8 and one upper point.

Figure 3:
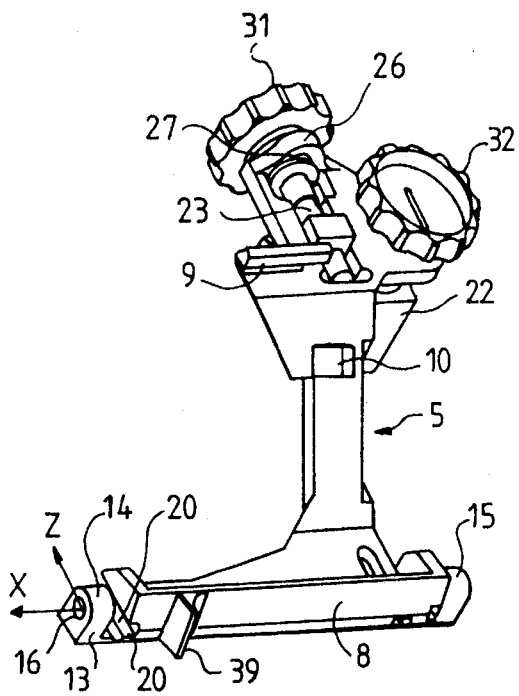
FIGS. 3 and 4 are front and back views in perspective of a stage used as an intermediate element in the hooking device according to the invention and of the pedestal and base of its fastening points to the helmet.
Figure 4:
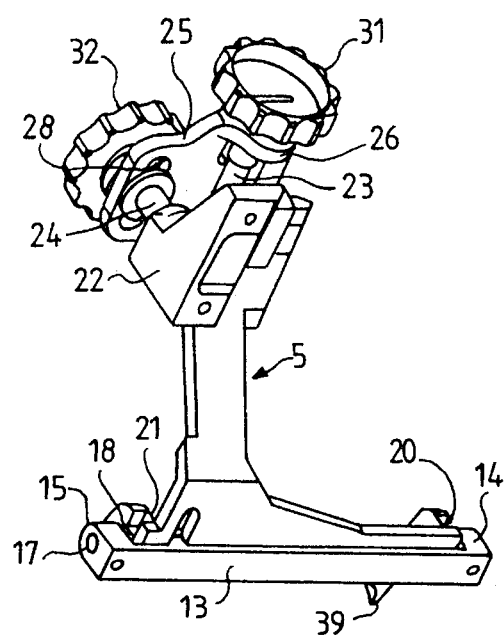
Figure 5:
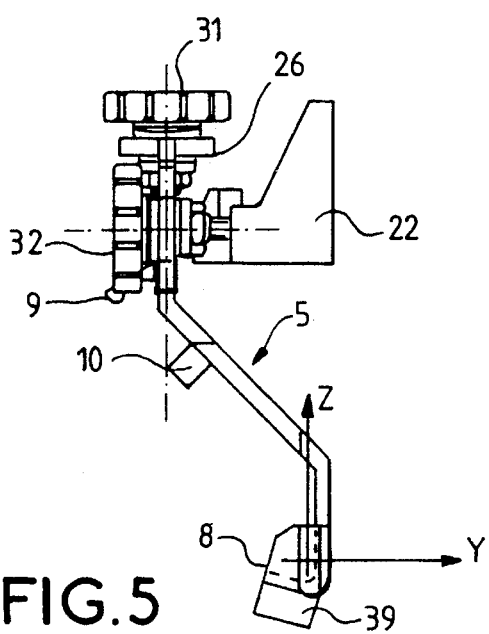
FIG. 5 is a side view of the stage shown in FIGS. 3 and 4 and of the base of its upper fastening point to the helmet.

As can be seen in FIGS. 2, 3, and 4, the lower fastening points of the stage 5 to the helmet 1 have a hinging system allowing two degrees of freedom of motion to remain, one in vertical translation and one in rotation about the axis of the channel 8 in order to enable adjustment of the position of the display system both vertically (axis Z) and laterally (axis Y) with respect to the helmet. This hinging system is formed by a hinge element that is fixed to the helmet 1 and grasps the two ends of the channel 8 between two rotating and sliding pins 18 permitting both a rotational movement about the hinge axis (axis X) and a translational movement in the sliding direction (axis Z).

The hinge element has a pedestal 13 with an elongated shape that is fixed to the helmet 1 by bonding, screwing or riveting and that comes below the channel 8 of the stage 5 with, at its two ends, two ears 14, 15 going beyond the ends of the channel 8. These two ears 14, 15 are pierced with two holes 16, 17 facing each other along an axis parallel to the channel 8 used to house two interposed pins 18 for linking with the ends of the channel 8. These interposed pins 18 are provided, on one hand, with a cylindrical tail fitting into a hole 16, 17 of an ear 14, 15 and permitting a rotational motion and, on the other hand, with a diametrical ridge sliding in a vertical groove 20, 21 made in the raised edge of the ends of the channel 8 and permitting a vertical translational motion.

The upper fastening point of the stage 5 to the helmet 1 is fitted out with position-adjusting means enabling adjustments of the position of the stage 5 vertically and laterally with respect to the helmet 1. It has a base 22 fixed to the helmet 1 by bonding, screwing or riveting and two adjusting screws 23, 24 positioned at right angles with respect to each other, one screw 23 which is vertical and the other screw 24 which is horizontal and perpendicular to the side wall of the helmet 1, the rods of which get screwed into threaded holes of the base 22 and the heads of which are confined in the upper part of the stage 5.

As can be seen more clearly in FIG. 4, the upper part of the stage 5 has two ears, one being a vertical ear 25 and the other a horizontal ear 26, pierced with oval holes 27, 28 through which passes there pass the rods of the adjusting screws 23, 24. The edges of these oval holes 27, 28 are held in grooves made at the base of the heads of the adjusting screws 23, 24 so as to fixedly join these screws to the upper part of the stage 5. The oval shape of the holes permits a transversal play of the adjusting screws in the ears 25, 26 of the upper part of the stage 5, this play being necessary for each adjusting screw 23, 24 by the effect of the adjusting of the other screw.

The grooves at the base of the head of the adjusting screws 23, 24 are made by means of nuts and spacing washers enabling dismounting while threaded buttons 31, 32 are negatively molded on the heads of the adjusting screws 23, 24 to make it easier to operate them.

Figure 6:
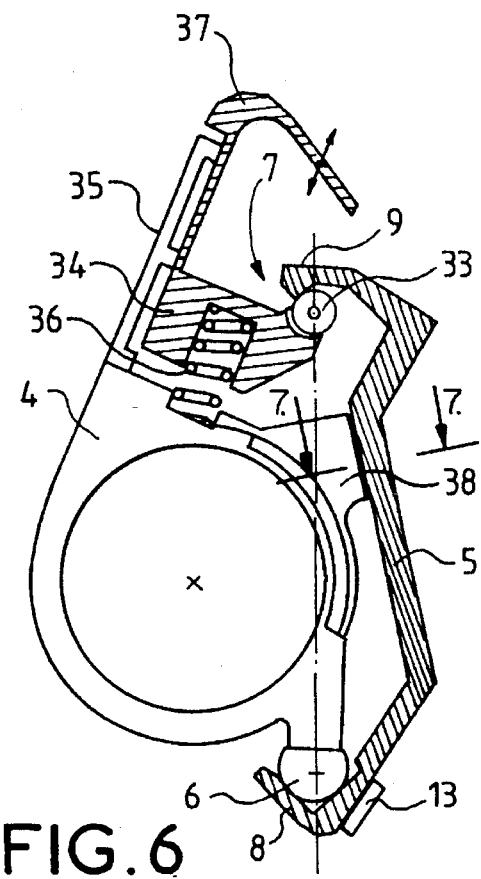
FIG. 6 is a sectional view of the sheath and the stage of a hooking device according to the invention illustrating their hooking mode.
Figure 7:
FIG. 7 is a partial sectional view along the line 7—7 of FIG. 6.

FIG. 6 gives a detailed view of the hooking of the sheath 4 to the stage 5 and the configuration of the hooking stub 7. The latter is formed by a roller 33 mounted on a piston 34 confined in a fin 35 extending the upper part of the sheath 4 upwards to make it easier to grasp. The piston 34 is pushed back by a spring 36 towards the hook jaw 9 of the stage and is fixedly joined by a trigger 37 projecting from the fin 35 so that it can be easily handled by the forefinger or the second finger.

It can furthermore be seen that the channel 8 of the stage 5 has a wide angle of aperture so as not to restrict the rotational play of the longitudinal ridge 6 of the sheath 4 about its axis and so as to ensure that the rotational locking arises solely out of the nesting of the centering pin 10, borne by the stage 5, in its cavity 11 made so as to be facing a shoulder 38 of the external wall of the sheath. The centering pin 10 and its cavity 11 have, as can be seen in the sectional view of FIG. 8, a prismatic shape enabling precise centering in all three dimensions of the sheath 4 with respect to the stage 5.

Through this hooking device, the helmet wearer can place or remove the display system on or from the helmet, with one hand and without looking. For the assembly, he grasps the display device by the sheath 4 in seeing to it that his thumb is placed while in the hollow cavity 12 (FIG. 2) and then lowers the sheath 4 along the lateral wall of the helmet 1 in presenting it tilted downwards so that the front end of its longitudinal ridge 6 is the first to come into contact with the channel 8 of the stage. He then follows the channel 8 with his thumb until he feels the positioning tappet 39, sets right the sheath 4 to make its longitudinal ridge 6 entirely penetrate the channel 8 and then pulls the sheath 4 down on his temple until the hook jaw 9 gets clipped on to the roller 33 of the hooking stub. For dismounting, all that the helmet wearer has to do is to grasp the display system by the sheath 4, press his forefinger on the trigger 37 and make the sheath 4 tilt towards the exterior of the helmet so that the longitudinal ridge 6 escapes from the channel 8 of the stage.

During a first operation of hooking the display system to the helmet, it may happen that the combiner 40 of the display system does not come into position exactly before the helmet wearer's eye owing to the diversity of the morphology of human faces. Action on the knob 31 of the vertical adjusting screw then corrects the error of the heightwise presentation of the combiner 40 while action on the knob 32 of the horizontal adjusting screw corrects the lateral error of the presentation of the combiner 40.

Figure 10:
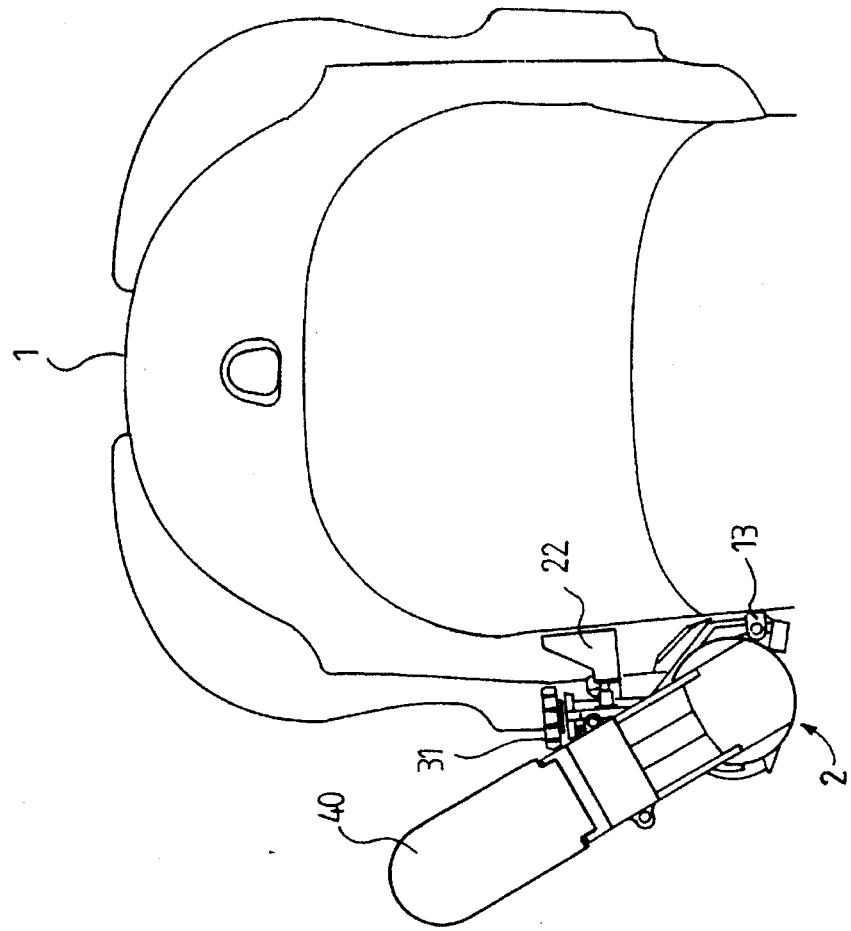
FIGS. 9 and 10 are front views of a helmet with a display system fixed with a hooking device according to the invention and placed in either an operational position or a retracted position
Figure 9:
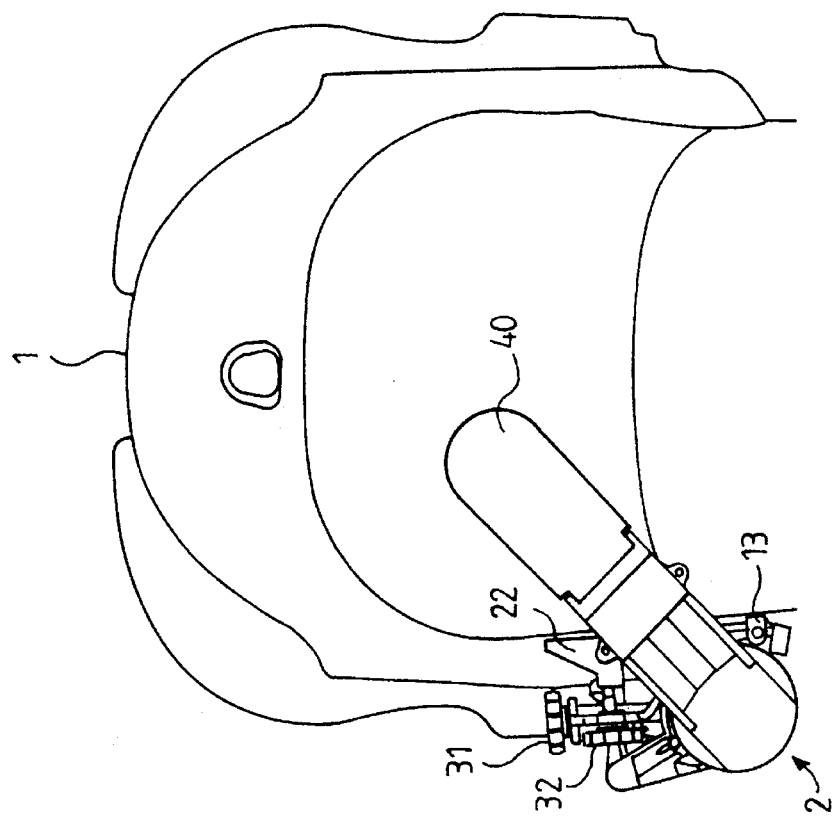

When the display system is fixed to the helmet, it should be placed in two distinct positions: a position of use called an operational position in which the combiner 40 comes before the helmet wearer's eye as shown as in FIG. 9 so that he can see the image of the display system superimposed on the external scene and a position of non-use called a retracted position in which the combiner 40 is placed outside the field of vision of the helmet wearer as shown in FIG. 10. These two positions are obtained by enabling the body of the display system to rotate in the sheath 4 and by providing for means to lock the rotation of the body of the display system in the sheath 4 in both the operational and the retracted positions.

Figure 8:
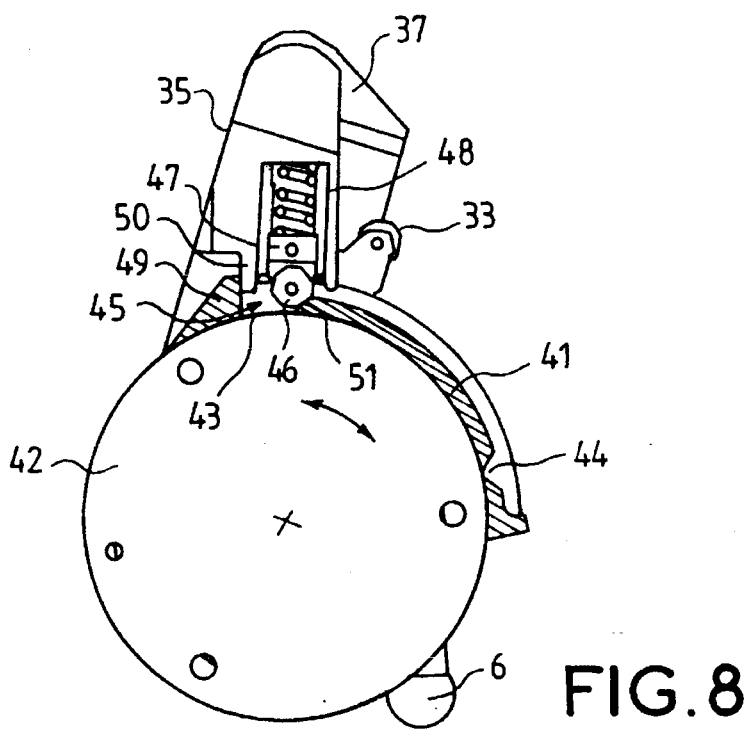
FIG. 8 is a section view of the sheath of a hooking device according to the invention, the section being made at the level of a device for the rotational locking, in the operational and retracting positions, of the body of the display system.

FIG. 8 gives a detailed view of these locking means. They comprise a cam 41 with the shape of a circular sector, fixed to the rim of the body 42 of the display system and provided with notches 43, 44 marking the operational and retracted positions and a toe 45 fixed in an elastic manner to the sheath 4 so as to slide on the cam 41 and penetrate the position-marking notches 43, 44.

The toe 45 is made by means of a roller 46 with a polygonal profile mounted at the end of a piston 47 which is confined in the arm 35 of the sheath 4. The piston 47 is placed in the arm 35 in a sleeve-shaped housing and is pushed back by a spring 48 towards the cam 41.

The cam 41 having the shape of a circular sector is furthermore provided with a end-of-travel shoulder 49 which, when the display system is in an operational position, comes into contact with a limit-stop finger 50 placed in the vicinity of the toe 45 on the arm 35 of the sheath 4. The notch 43 of the cam 41 marking the operational position presents the octagonal-profile roller 46 with an inclined face 51 pointed towards the end-of-travel shoulder 48. Through this arrangement, the thrust of the roller 46 on the inclined face 51 increases the pressure of limit-stop finger 50 on the end-of-travel shoulder 49, thus making it possible to get rid of clearances and give high precision to the operational position.

It will be seen that the hooking device just described enables fast hooking and unhooking of the display system on to and from a helmet, with only one hand and without any special practice, and that it gives the possibility of unhooking by a reflex action in critical situations. It furthermore provides for high reliability in repositioning and gives a modular aspect to the display function. Different sorts of display devices such as night vision devices, synthetic image vision devices for piloting assistance can be fitted out with the same hooking device and be interchanged on one and the same helmet.

Obviously, the numerous modifications and variations of the present invention are possible in light of the above teachings. It is therefore to be understood that within the scope of the appended claims, the invention may be practiced otherwise than be specifically described herein.

What is claimed is:

1. A device for mechanical hooking a display system to a helmet, comprising:

a sheath which surrounds a body of a display system connected to a combiner forming an eye-piece of the display system that is positionable before an eye of a wearer of the helmet, said sheath having a longitudinal ridge projecting out of a lower part of a side wall thereof pointed towards the helmet and acting as a guiding shaft and as a fastening lug, and a hooking stud projecting from an upper part of a side wall thereof, and pointed towards the helmet; and a stage fixable to a side wall of the helmet at two lower fastening points by hinging means permitting two degrees of freedom, one of said degrees of freedom being in vertical translation and the other in rotation about an axis passing through said lower fastening points, and at an upper fastening point by position-adjusting means enabling positional adjustments in vertical and lateral directions with respect to the helmet and which comprises, in a lower part thereof, a channel with dimensions corresponding to the longitudinal ridge of the sheath in which it is confined and, in an upper part thereof, a hook jaw engaged with the hooking stud of the sheath for keeping the sheath in position on the stage.

2. A device according to claim 1 which comprises, positioned so as to be facing the sheath and the stage, a centering pin and a cavity having a complementary shape and cooperating to give the sheath a hooking position with respect to the stage.

3. A device according to claim 1, wherein said hooking stud comprises a roller mounted on a piston confined in the upper part of the side wall of the sheath, biased back by a spring against the hook jaw of the stage and fixedly joined to a trigger projecting out of the upper part of the side wall of the sheath.

4. A device according to claim 1, wherein said hinging means located at the lower fastening points comprises a hinge element fixable to the helmet and engaged with the ends of the channel of the stage contacting grooves permitting vertical translational motion in addition to rotational motion.

5. A device according to claim 4, wherein said hinge element has an elongated pedestal fixable to the helmet extending below the channel of the stage with, at two ends thereof, two ears that extend beyond each side of the ends of the channel and which have formed therein two holes facing each other along an axis parallel to the channel and wherein two interposed pins forming pivot pins are positioned between raised edges of the ends of the channel and the ears of the pedestal and that are provided, on one side, with a cylindrical tail fitting into a hole of an ear and, on the other side, with a diametrical ridge sliding in a vertical groove formed in the raised edge of one end of the channel.

6. A device according to claim 1, wherein said means for adjusting the position of the upper fastening point of the stage comprise: a base fixable to a lateral wall of the helmet and two adjusting screws positioned at right angles with respect to each other, one of said screws being vertical and the other screw being horizontal, the screws including screw rods which are screwed into threaded holes formed in the base and including heads which are confined in the upper part of the stage.

7. A device according to claim 6, wherein the upper part of the stage comprises two ears, one of said ears being vertical and the other of said ears being horizontal, said ears being pierced with oval holes through which pass the rods of the adjusting screws, wherein the heads of the screws have a groove confining edges of the oval holes, said oval holes demarcating a range of transversal play.

8. A device according to claim 1, wherein the stage comprises a positioning tappet located on the back of the channel.

9. A device according to claim 1, wherein the sheath permits the body of the display system to be rotationally free, enabling the display system to assume various positions, including a first, operational position where the combiner is positionable before an eye of the helmet wearer and a second, retracted position, where the combiner forming the eye-piece is positionable outside the field of vision of the helmet wearer.

10. A device according to claim 9, wherein the sheath comprises means for rotationally locking the body of the display system in the operational and retracted positions.

11. A device according to claim 10, wherein said rotational locking means comprise a cam in the shape of a circular sector and is provided with notches, marking the operational and retracted positions, and a toe elastically fixed to the sheath so as to be slidable on the cam and engage the position-marking notches.

12. A device according to claim 11, wherein said toe comprises a roller mounted on a piston confined by the sheath and biassed by a spring against the cam having the shape of a circular sector.

13. A device according to claim 11, wherein said locking means comprise a limit stop finger positioned on the sheath in the vicinity of the toe, facing the cam in the shape of a circular sector, and an end-of-travel shoulder placed at one of the ends of the cam in the shape of a circular sector so that said limit stop finger comes to rest against the shoulder when the display system is in an operational position.

14. A device according to claim 13, wherein the notch identifying the operational position on the cam having the shape of a circular sector presents the toe with an inclined face pointed towards the shoulder so that the support of the toe reinforces contact between the limit-stop finger and the shoulder and eliminates play.

15. A device according to claim 14, wherein the toe comprises a polygonally profiled roller mounted at the end of a piston that is confined in the sheath and pushed back by a spring against the cam that has the shape of a circular sector.

16. A device for mechanically hooking a display system to a helmet, comprising:
   a sheath which surrounds a body of a display system connected to a combiner forming an eye-piece of the display system that is positionable before an eye of a wearer of the helmet, said sheath having a longitudinal ridge projecting out of a lower part of a side wall thereof pointable towards the helmet and acting as a guiding shaft and as a fastening lug, and a hooking stud projecting from an upper part of a side wall thereof and pointable towards the helmet, and
   a stage fixable to a side wall of the helmet at two lower fastening points by a hinging mechanism permitting two degrees of freedom, one degree of freedom being in vertical translation and the other in rotation about an axis passing through said lower fastening points, and at an upper fastening point by a position-adjusting mechanism enabling positional adjustments in vertical and lateral directions with respect to the helmet and which comprises, in a lower part thereof, a channel with dimensions corresponding to the longitudinal ridge of the sheath in which it is confined and, in an upper part thereof, a hook jaw engaged with the hooking stud of the sheath and keeping the sheath in position on the stage.

17. A device according to claim 16, which comprises, positioned so as to be facing the sheath and the stage, a centering pin and a cavity having a complimentary shape and cooperating to give the sheath a hooking position with respect to the stage.

18. A device according to claim 16, wherein said hooking stud comprises a roller mounted on a piston confined in the upper part of the side wall of the sheath, biassed by a spring against the hook jaw of the stage and fixedly joined to a trigger projecting out of the upper part of the side wall of the sheath.

19. A device according to claim 16, wherein said hinging mechanism located at the lower fastening points comprises a hinge element fixable to the helmet and engaged with the ends of the channel of the stage grasped by grooves permitting vertical translational motion in addition to rotational motion.

20. A device according to claim 19, wherein said hinge element has an elongated pedestal fixable to the helmet extending below the channel of the stage with, at two ends thereof, two ears that extend beyond each side of the ends of the channel and which have formed therein two holes facing each other along an axis parallel to the channel and wherein two interposed pins forming pivot pins are positioned between raised edges of the ends of the channel and the ears of the pedestal and that are provided, on one side, with a cylindrical tail fitting into a hole of an ear and, on the other side, with the diametrical ridge sliding in a vertical groove formed in the raised edge of one end of the channel.

21. A device according to claim 16, wherein said position-adjusting mechanism adjusting the position of the upper fastening point of the stage comprises:
   a base fixable to the lateral edge of the helmet and two adjusting screws positioned at right angles with respect to each other, one of said screws being vertical and the other screw being horizontal, the screws including screw rods which are screwed into threaded holes formed at the base and heads which are confined in the upper part of the stage.

22. A device according to claim 21, wherein the upper part of the stage comprises two ears, one of said ears being vertical and the other of said ears being horizontal, said ears being pierced with oval holes through which pass the rods of the adjusting screws, wherein the heads of the screws have a groove confining edges of the oval holes, said oval holes demarcating a range of transversal play.

23. A device according to claim 16, wherein the stage comprises a positioning tappet located on the back of the channel.

24. A device according to claim 16, wherein the sheath permits the body of the display system to be rotationally free, enabling the display system to assume various positions, including a first, operational position wherein the combiner forming the eye-piece is positionable before an eye of the helmet wearer and a second, retracted position, where the combiner forming the eye-piece is positionable outside the field of vision of the helmet wearer.

25. A device according to claim 24, wherein the sheath comprises a mechanism rotationally locking the body of the display system in the operational and retracted positions.

26. A device according to claim 25, wherein said rotational locking mechanism comprises a cam in the shape of a circular sector and is provided with notches, marking the operational and retracted positions, and a toe elastically fixed to the sheath so as to be slidable on the cam and engage the position-marking notches.

27. A device according to claim 26, wherein said toe comprises a roller mounted on a piston confined by the sheath and biassed by a spring against the cam having the shape of a circular sector.

28. A device according to claim 26, wherein said locking mechanism comprises a limit stop finger positioned on the sheath in the vicinity of the toe, facing the cam in the shape of a circular sector, and an end-of-travel shoulder placed at one of the ends of the cam in the shape of a circular sector so that said limit stop finger comes to rest against the shoulder when the display system is in an operational position.

29. A device according to claim 28, wherein the notch identifying the operational position of the cam having the shape of a circular sector presents the toe with an inclined face pointed towards the shoulder so that the support on the toe reinforces the contact between the limit-stop finger and the shoulder and eliminates play.

30. A device according to claim 29, wherein the toe comprises a polygonally profiled roller mounted at the end of a the piston that is confined in the sheath and pushed back by a spring against the cam that has the shape of a circular sector.

* * * * *